Figure 1:
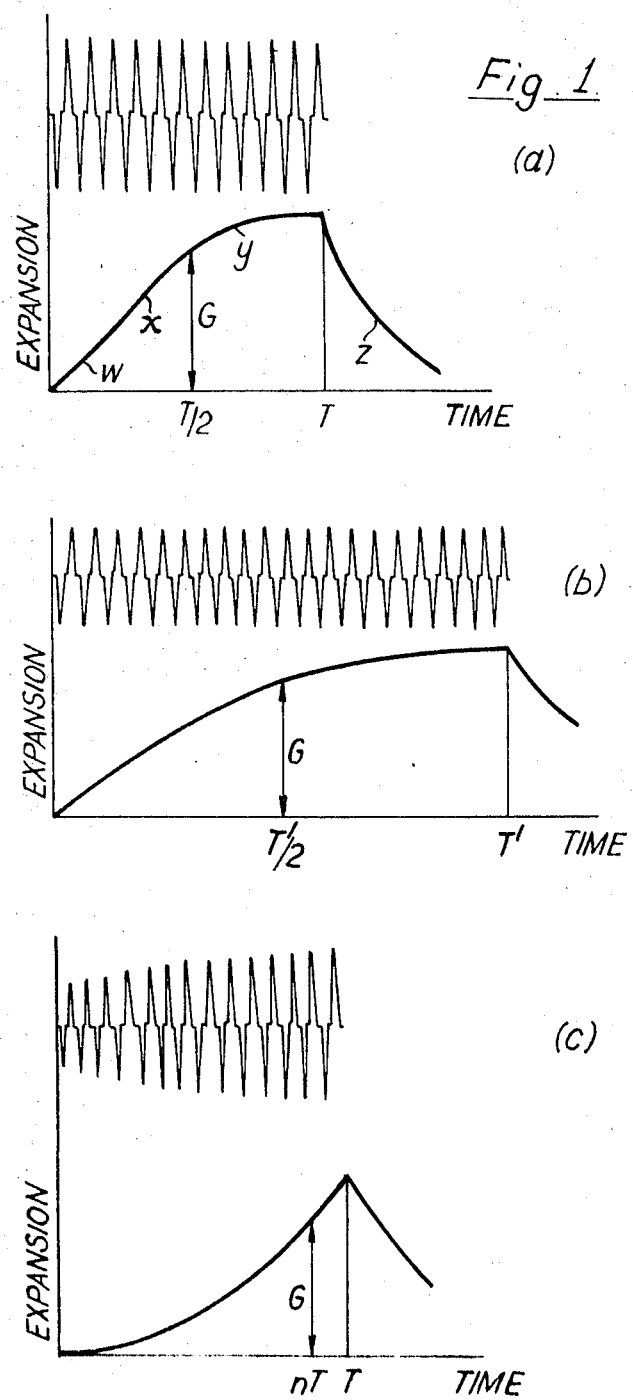

United States Patent

[11] 3,585,347

| [72] | Inventors | James Christopher Needham<br>Saffron, Walden, Essex;<br>David Bernard Benton, Cambridge;<br>Malcolm Douglas Hannah, Cambridge, all<br>of, England |
|---|---|---|
| [21] | Appl. No. | 811,375 |
| [22] | Filed | Mar. 28, 1969 |
| [45] | Patented | June 15, 1971 |
| [73] | Assignee | The Welding Institute<br>Cambridge, England |
| [32] | Priority | Apr. 1, 1968 |
| [33] | | Great Britain |
| [31] | | 15580/68 |

[54] QUALITY CONTROL IN RESISTANCE WELDING
5 Claims, 7 Drawing Figs.

[52] U.S. Cl. .................................................. 219/110,
219/117
[51] Int. Cl. .................................................. B23k 11/24

[50] Field of Search ........................................... 219/108-
—110, 114, 86

[56] References Cited
UNITED STATES PATENTS

| 2,024,019 | 12/1935 | Wright ........................ | 219/110 |
| 2,024,542 | 12/1935 | Simon ......................... | 219/110 |
| 3,400,242 | 9/1968 | Waller ......................... | 219/110 |
| 3,404,252 | 10/1968 | Michael ....................... | 219/110 |

*Primary Examiner*—J. V. Truhe
*Assistant Examiner*—J. G. Smith
*Attorney*—Kemon, Palmer & Estabrook ABSTRACT: In a resistance welding process, the rate of displacement of a movable electrode, due to expansion of the heated workpieces between the welding electrodes, is measured in a first part of a welding operation and the current flow is then continued after the said first part for a period which is a function of the result of the measurement.

QUALITY CONTROL IN RESISTANCE WELDING

This invention is concerned with resistance welding, in which two workpieces are squeezed between electrodes and a high current is passed to heat the workpiece at the sheet interface and weld them together. In such a process it is important that the welds shall be of a consistently high quality. An undersize weld may have low strength. With stitch or seam welds, undersize welds will result in insufficient overlap and a leaky joint. An oversize weld is due to too great a heat input and this results in excessive deformation or indentation of the workpiece and may also result in expulsion of weld metal to give a splashed weld of low strength.

In spite of attempts to hold constant the conditions, for each of a number of resistance welds, it will be found that the welds obtained vary in quality. Broadly speaking, there are three parameters which can be altered in the resistance welding process, these being the electrode pressure, the magnitude of the weld current and the duration of the weld current. These parameters have different optimum values for different materials and sheet thicknesses. We have found that, while the electrode pressure and the duration of the weld current can be closely controlled by preset devices, the magnitude of the heat generated by the welding current will vary. The reason for this is that the workpieces present a number of paths for the current flowing between the electrodes and the resistance of these paths will vary with the surface condition of the material, the "fit" of the component and the closeness and number of neighboring welds. In addition supply voltage fluctuations will vary the welding current. It is therefore desirable to indicate changes in heat input and therefore weld size.

Resistance welding is accompanied by electrode movement caused by the expansion of the workpiece and the change from solid to liquid state of a portion of the workpiece during the passage of the current. As the weld progresses this expansion is offset by the sinking of the electrode into the softened workpiece and when the current ceases cooling causes the electrodes to move together.

It has previously been proposed to use the electrode displacement as a measure of the quality of the weld or to provide automatic control of the welding operation. Thus in one prior proposal, the upward displacement of the electrode due to the expansion of the workpiece was used as a measure of the quality of the weld.

We have found that, although in some cases the relationship between the heat input, the heat loss and the electrode embedding is such that the maximum head displacement is roughly proportional to the heat input, in other cases the measurement of the upward displacement of the electrode is not a reliable guide to weld quality and cannot be used for satisfactory automatic control.

Where expulsion of metal (splash) occurs the electrode displacement can be less than that of an acceptable weld, made with a lower heat input. A splashed weld results from too high a heat input which causes expulsion of liquid portions of the workpiece as a consequence of which the electrode may sink prematurely into the softened workpiece. Thus, the upward displacement of the electrode may be equal to or less than that which would result from a much lower current flow in a weld which was not splashed. An equal displacement would obviously provide an incorrect indication of quality in a method relying on displacement measurement. Reduced upward displacement would be interpreted in a method relying on maximum displacement for automatic control as an indication that more current was required whereas the current flow is already too great.

In our prior U.S. Pat. No. 3,400,242 we have proposed that the indication of faulty welds should be based on the measurement of the rate of separation of the electrodes due to the expansion of the workpiece during an initial portion of the welding operation. Such a method satisfactorily indicates splashed welds since the initial rate of expansion of the workpiece is too high for such welds and moreover provides an indication of the direction in which a correction should be made.

Such monitoring methods are useful in that they identify faulty welds without resorting to destructive inspection. However, it would obviously be preferable to permit correction of weld cycles which, if uncorrected, would result in faulty welds and in our above-mentioned prior specification we have also suggested a method of automatic correction by adjustment of the current amplitude in accordance with the result of the initial rate of expansion. The present invention provides an alternative method of automatic correction which is in many cases preferable to that proposed in prior U.S. Pat. No. 3,400,242.

According to the invention, the rate of expansion is measured in an early portion of the welding cycle, before the rate of expansion begins to decrease, and the weld is continued after the measurement for a period which is a function of the result of the measurement, the period being longer for smaller rates of expansion and shorter for larger rates of expansion. This provides a relatively simple method of automatic correction which is generally satisfactory, except for welding currents which are much too small and will not produce a sufficiently large weld nugget even with considerable extensions of weld time. This is because for such situations the heat losses become as large as the heat input to the weld, the surrounding sheet material constituting a very effective heat sink. To overcome this difficulty, an indicator can be provided for indicating a faulty weld if the weld extends for more than a predetermined period of time. However, a better method is to arrange for the welding current to increase at a predetermined slow rate so that for such long-period welds, the current steadily increases in order to overcome the heat sink effect and to ensure the continuation of nugget growth. For example, it could be arranged that the current increased steadily to a value of 30 percent above the initial value in the course of 25 cycles of the supply, assuming a normal cycle time of about 10 cycles. For normal weld, the total change in weld current would be relatively small. Alternatively, the increase in current could be arranged to come into effect only after a predetermined period of time.

It should be realized that not all materials will need the additional current. For some materials which have a much greater resistance when hot and which will consequently be subjected to increasing heat as the weld continues, no current increase is required.

Figure 2:
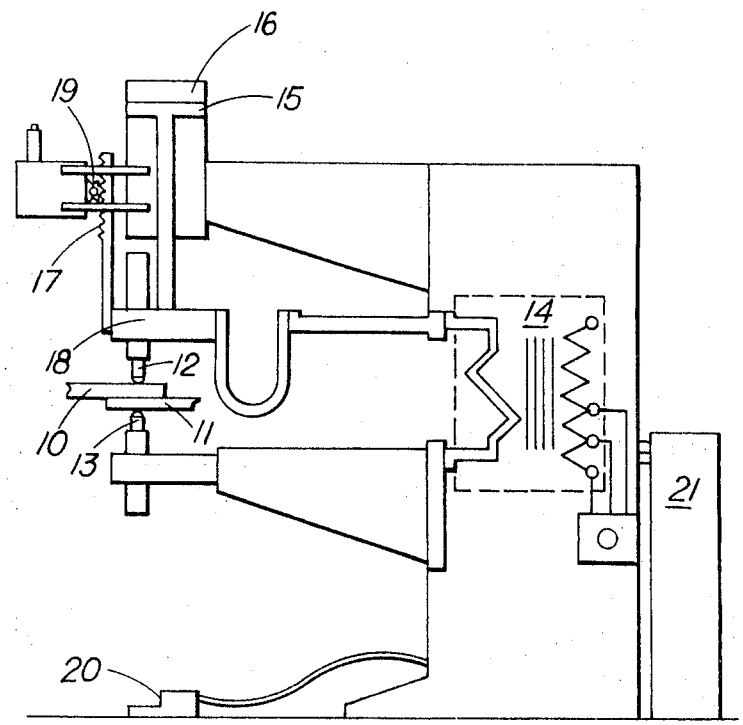
Figure 3:
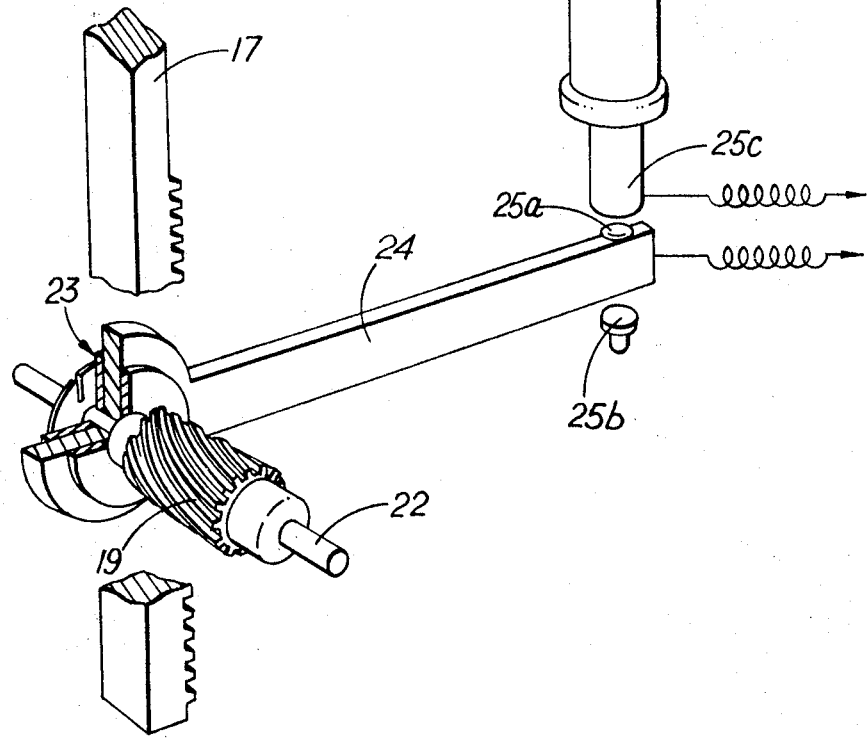
Figure 4:
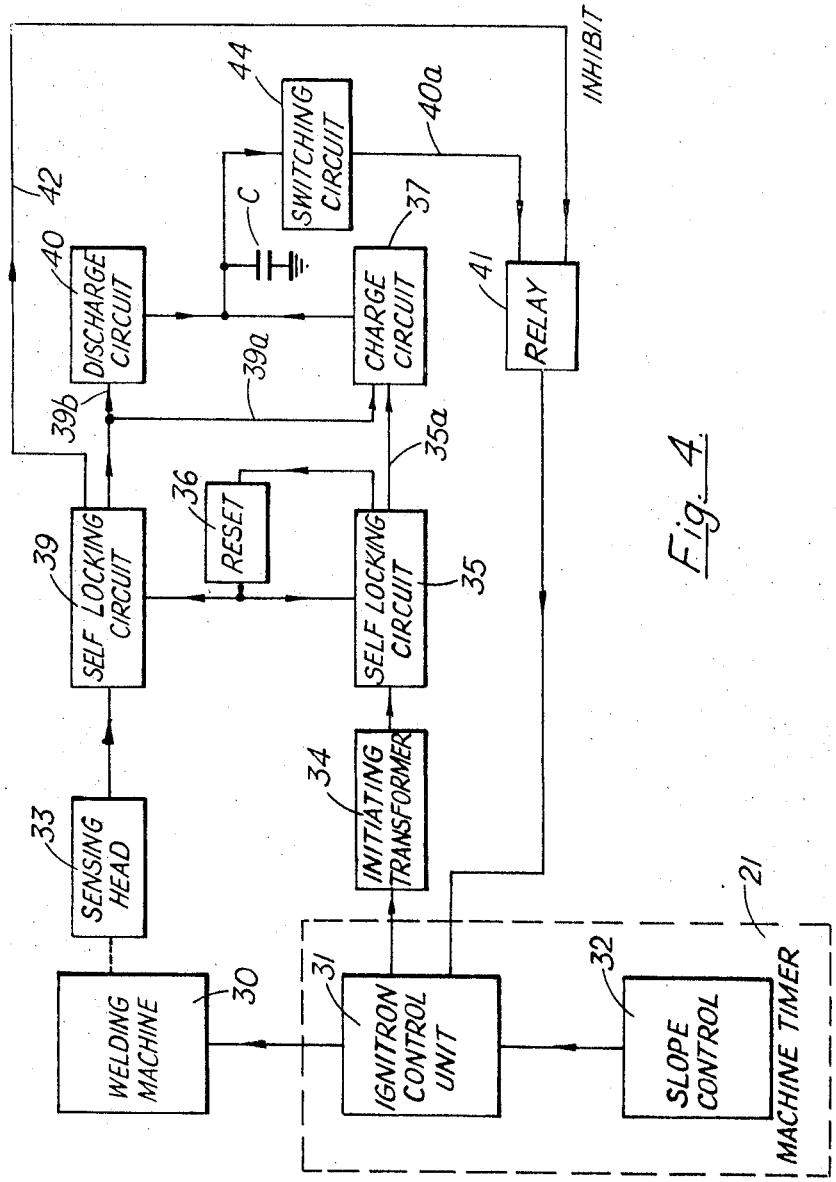
Figure 5:
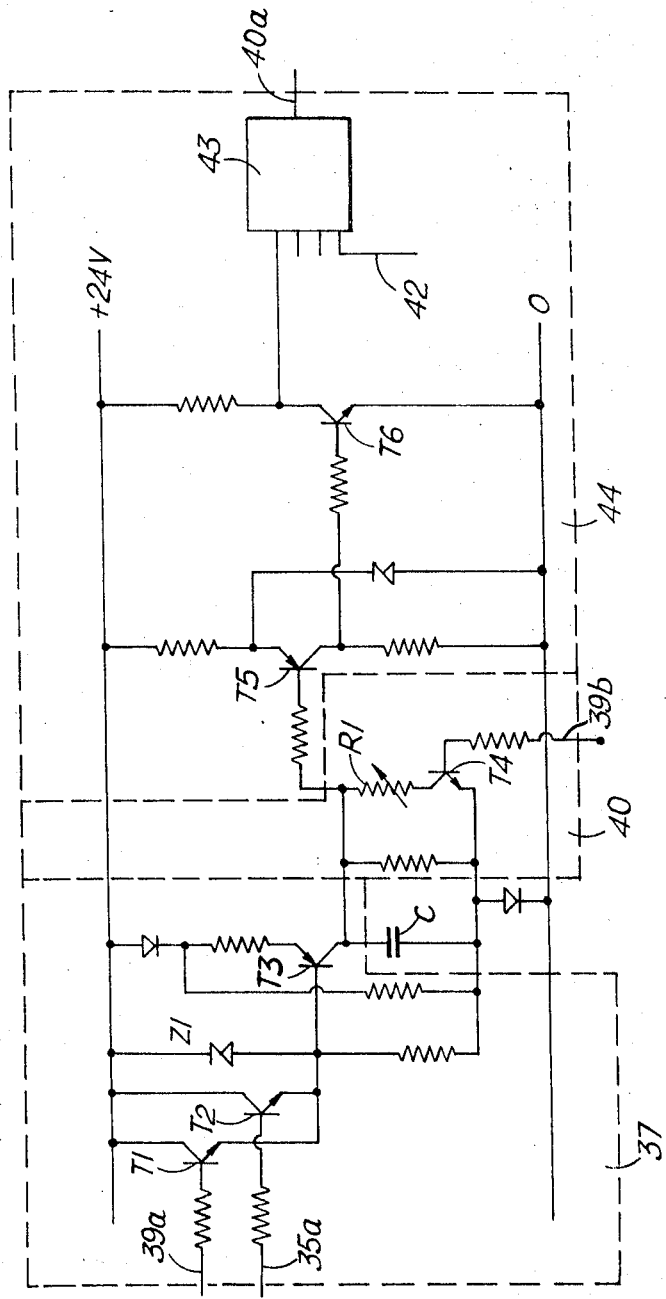

In order that the invention may be better understood, one example will now be described with reference to the accompanying drawings, in which:

FIGS. 1a, 1b and 1c are waveform diagrams illustrating weld cycles;

FIGS. 2 and 3 show apparatus for carrying out a method according to the invention; and FIGS. 4 and 5 show a control circuit used with the apparatus of FIGS. 2 and 3.

In conventional resistance welding, when the weld duration, electrode tip size and electrode load have been fixed, the current is adjusted by the operator until a nugget of the desired size is obtained. In practice, this is often achieved by raising the current until a splashed weld occurs and then reducing the current slightly to give as large a nugget as possible whilst avoiding splashing. The tolerance in the values of the main variables is not very large. As an example, in one series of tests, nine cycles of welding current of a given amplitude produced an expansion of 0.0065 inches, and resulted in an acceptable weld. When the current was reduced by 15 percent, nine cycles resulted in an expansion of only 0.003 inches and the weld was not acceptable. Similarly, when the current was increased by 15 percent, the expansion rose rapidly to 0.009 inches after six cycles of welding current, after which the weld splashed and consequently was unacceptable.

FIG. 1a shows a generalized expansion curve for a given current level. The horizontal axis represents time and the waveform in the upper part of the diagram represents the welding current. The expansion curve starts with a stage $w$ of increasing slope, followed by a stage $x$ of substantially constant slope while the nugget is developing in size, after which there is a third stage $y$ of decreasing slope towards the end of a normal weld period; this is the time when the expansion of the workpiece is offset by secondary factors such as electrode indentation. Finally, after the weld current has ceased there is a fourth stage $z$ in which contraction takes place. In FIG. 1a, the end of the welding cycle has been marked with the letter T and a further indication T/2 has been inserted at the midpoint in the weld duration. At this midpoint, the expansion which has taken place is marked with the letter G.

The present invention is based in part on a measurement of the rate of expansion, this measurement being usually made before the rate of expansion begins to decrease; thus the value obtained is for an initial portion of the weld cycle and this measurement can be made by measuring the time taken by the workpieces to expand through a predetermined distance. If this predetermined distance is the distance G, the sensing elements may be set with an initial gap G and it is arranged that this gap is progressively closed as the workpiece expands so that the sensing elements contact one another when an expansion through distance G has been accomplished. In the method which is being described, the weld duration is a variable parameter and is always equal to twice the time required for an expansion through distance G. In FIG. 1b, the amplitude of the current has been reduced and consequently T'/2 is longer than T/2. A further period T'/2 elapses before the welding current is cut off. The extra time allows the weld nugget to continue to develop so that although it is being formed at a lower rate than normal, in the extended weld cycle it reaches the required size for an acceptable weld. In a similar manner, if the weld current is too high the expansion through distance G takes place in a period shorter than T/2 and consequently the growth of the weld nugget is stopped, by switching off the welding current, after a time less than T.

This system is extremely simple and has the advantage that the expansion rate is measured over a substantial proportion of the expansion curve, and is therefore more accurate than the system in which the rate is measured over a smaller initial portion of the curve. In fact, the expansion measurement can be taken over a portion of the welding cycle which is greater than one-half. As an example, the distance G may be increased to a value attained after two-thirds of a normal weld duration with a normal welding current; it is then arranged that whatever period is required for an expansion to take place through the new distance G, the welding cycle continues for a further interval equal to one-half of the said period. The method described also has the advantage that no complex initial calibration is required; the expansion gap G is merely increased for a given welding condition until the desired nugget size is reached, and thereafter the automatic adjustment of weld duration compensates for changes in weld current.

The method described above corrects for reasonable variations in the supply voltage and in the electrode load. However, if the weld current is excessively high, it may cause the weld to splash after a period less than twice the time required for the expansion through the distance G. At the other end of this scale, if the current is excessively low, a small unacceptable weld may result in spite of the increase in weld duration. This is because the workpieces act as a heat sink and for smaller currents the rate of removal of heat decreases less than the heat input. In extreme cases, the current may be so low that a point is reached in the extended weld cycle at which the rate of heat removal is equal to the rate of heat input.

To avoid unacceptable welds in these extreme conditions, we arrange that the current increases slowly either from the beginning of the weld cycle to its end or from a predetermined point in the weld cycle. An increase in current from the beginning of the weld cycle is illustrated in FIG. 1c. In this case, the expansion curve has taken on a concave appearance and in the example illustrated the distance G is such that the weld is continued, after the expansion through distance G, for only a fraction of the time taken to achieve the expansion G.

Thus in the case of a current which is lower than usual, the fact that the current steadily increases means that the increase in heat input offsets the effect of the heat sink for a weld of longer duration. If the current is higher than usual, the only effect of the increase in current during the weld cycle is to reduce the duration of the weld cycle.

We have found that using the method illustrated in FIG. 1c, although the initial current in different examples may show substantial variation, the values of the final current in these examples at the end of the weld period are less divergent than in examples in which the upward current slope is not used. In addition, the weld nuggets obtained are very similar in size.

In many conventional welding machines, the weld is allowed to continue until the sinking of the electrode is such that a slight contraction of the electrode spacing takes place; in this way it is ensured that the maximum expansion has occurred. Due to the increase in current, in FIG. 1c, this contraction is unlikely to occur within the weld cycle and this facilitates the use of a longer portion of the weld for the measurement of the rate of expansion.

We have shown above that the method described provides a large tolerance for current variations. We have also found that it permits a large tolerance for conditions other than current. These variables include the surface condition, the supply voltage, the electrode load, and the condition of the electrode tip. In all cases the effect of these variables is reduced by the use of the weld cycle duration adjustment in combination with the progressively increasing current.

Apparatus and circuits for carrying into effect the method according to the invention are illustrated in FIGS. 2, 3, 4 and 5 of the accompanying drawings. In FIG. 2, two superimposed workpieces 10 and 11 are held under pressure between two electrodes 12 and 13 connected to the terminals of the secondary winding of a welding transformer 14. The electrode 12 is movable and the pressure on this electrode is controlled by a piston 15 operating in an air cylinder 16. A foot-switch 20 initiates the welding operations and a timer and power control unit 21 sets a maximum limit for the duration of the weld. The timer in the unit 21 may be that found on conventional machines. In the present example, it is used only to switch off the machine if the current is so low that a good weld cannot possibly result; for example, after a weld period longer than the maximum expected weld time.

The movement of the upper electrode during a weld is sensed by a device including a rack 17 (see also FIG. 3), mechanically connected to an arm 18 carrying the upper electrode 12, and a pinion 19 driven by the rack. The pinion 19 is mounted on a shaft 22 which transmits the rotary movement of the pinion through a clutch to a lever 24. In the form shown, the clutch includes two friction pads bearing against an intermediate disc. The remote end of the lever 24 carries an electrical contact 25a and travels between two stops 25b and 25c. A gap corresponding to the predetermined electrode movement G is set between contact 25c and contact 25a when lever 24 rests on stop 25b. Initially, the lever 24 rests on the stop 25b. As expansion takes place the movement of the electrode causes angular movement of the lever 24 as a result of which contact 25a leaves stop 25b and, when the electrode movement G has taken place, contact 25a abuts against stop 25c. The latter stop is also an electrical contact and connections extend from this and the lever 24 to the cycle duration control circuit. Any further expansion merely causes slipping of the clutch. The clutch is reset when the electrode is lowered into its operative position for the next weld.

FIG. 4 is a block diagram of the apparatus, including the duration control circuit. In this block diagram, the welding machine 30 is supplied from an ignitron control unit 31, both of these blocks representing conventional apparatus. The slope control 32, which causes an upward slope of the amplitude of the welding current waveform (see FIG. 1c), is also conventional in basic design although in this case the rate of increase of current is much slower than that which has been used in prior welding machines employing an increasing welding current. The sensing head 33 is of the form illustrated in FIG. 3. When a weld is started the ignitron control unit 31 supplies current to the welding machine and also to an initiation transformer 34. The transformer 34 actuates a self-locking circuit 35. The circuit 35 starts the operation of a timing circuit 36, the purpose of which is to reset all units after a period longer than the expected duration of any weld cycle. This resetting circuit may, for example, have a period of several seconds. The self-locking circuit 35 also initiates the operation of a charging circuit 37 through which a substantially constant current flows to a capacitor C.

As the weld progresses, the electrical contacts of the sensing head approach one another, as described in connection with FIG. 3, and when they make electrical contact with one another they actuate a further self-locking circuit 39. This latter circuit then applies to a signal to the charging circuit 37 to stop the charging of capacitor C and a further signal to a discharging circuit 40 to start the discharge of capacitor C. The rate of discharge is controlled in accordance with the required relationship between the period prior to the closing of the sensing head contacts and the welding period following this closure. When the charge on the capacitor has reduced to a predetermined level, a relay circuit 41 is operated and applies to the ignitron control unit 31 a signal which stops the supply of welding current to the machine 30. At the end of its timing period, the circuit 36 resets the self-locking circuits 35 and 39 and the duration control unit is then ready for the next weld.

The self-locking circuits 35 and 39 may include self-latching relays but we prefer to use solid state circuits because they can be expected to have a longer operational life. The known self-locking circuit employing two interconnected NOR gates can be used.

A connection 42 extends from the self-locking circuit 39 to the relay unit 41. This is an inhibiting connection to prevent the relay unit 41 from operating when the capacitor charge is below the predetermined level during the charging part of the cycle.

FIG. 5 shows the charging and discharging circuit in greater detail. The capacitor C is charged through a transistor T3 and is discharged through a transistor T4 in series with a variable resistor R1. Before the commencement of a welding cycle, transistor T3 is held in its nonconducting condition as a consequence of conduction in transistor T2 which short circuits the Zener diode Z1. Transistor T2 is held in its conducting condition by a signal on conductor 35a from the self-locking circuit 35. At this time transistor T1 is nonconducting as a consequence of a signal on conductor 39a from the self-locking circuit 39. Similarly, transistor T4 is nonconducting as a consequence of a signal on conductor 39b from the self-locking circuit 39.

When the welding cycle commences the self-locking circuit 35 is actuated and applies over conductor 35a a signal to switch off transistor T2. With both transistors T1 and T2 off, the voltage established across the Zener diode Z1 establishes conduction in transistor T3 and a substantially constant current flows into the capacitor C. This continues until the sensing head contacts close. At this point the signals on conductors 39a and 39b change in such a manner that both transistors T1 and T4 are rendered conducting. Transistor T1 now short circuits the Zener diode and stops the flow of charging current through transistor T3 and transistor T4 permits capacitor C to discharge through the variable resistor R1.

While the charge on the capacitor is at a high level, the transistor T5 is held in a nonconducting condition. When the flow of current from the capacitor C has reduced the voltage across the capacitor to a predetermined level, transistor T5 becomes conductive. As a consequence, transistor T6 conducts and, through a NOR gate 43, applies an operating signal over conductor 40a to the relay unit 41.

As explained in connection with FIG. 4, a signal from the self-locking circuit 39 by way of conductor 42 prevents the application of an actuating signal over conductor 40a before the sensing head contacts have closed. This is necessary because transistor T5 will conduct for a brief period at the beginning of the charging cycle, until the voltage across the capacitor reaches the predetermined level.

It will be realized that the period between the commencement of discharge and the point at which the relay unit 41 is operated depends on the rate of discharge and on the voltage across the capacitor when the discharge commences. The rate of discharge is governed by resistor R1. For operation in accordance with FIG. 1b, where the portion of the welding period following the closure of the sensing head contacts is equal to the portion of the welding period preceeding their closure, the period of discharge before actuation of the relay circuit must be equal to the period of charge of the capacitor C. For operation in accordance with FIG. 1c, the value of the variable resistor R1 must be reduced so that the portion of the welding period following closure of the sensing head contacts is a fraction of the portion of the welding period preceding their closure. Variable resistor R1 is preset to give the required relationship.

The other factor affecting weld duration results in variation of the weld period to permit correction, for example, for a low current or a high current in the initial portion of the weld cycle. As explained in connection with FIGS. 1a and 1b, if the welding current is too low the period preceding closure of the sensing head contacts will be longer. As a consequence, capacitor C will have charged to a higher value and its discharge period will be correspondingly greater. If the welding current is too high the sensing head contacts will close in a shorter period and as a consequence the charge on capacitor C will be relatively small. In this case, the capacitor takes less time to discharge to the predetermined value required for operation of the relay unit and termination of the weld.

It will be appreciated that the invention is not confined to a mechanical detector for sensing the rate of expansion of the workpieces. As alternatives, hydraulic means can be used to measure the rate of electrode separation or an ultrasonic detector can be used to measure the growth of the weld nugget.

The invention can be applied to spot, seam, or stitch welding.

We claim:

1. A method of controlling a resistance welding cycle, comprising the steps of:
    bringing together under pressure between the electrodes two workpieces to be joined;
    establishing a flow of electric current between the electrodes and through the two workpieces to be welded;
    measuring the duration of a first period required to achieve a given expansion of the workpieces in an initial portion of the welding cycle;
    timing a second period, starting at the end of the first period, which is a function of the length of the first period, the second period being longer for longer values of the first period and shorter for shorter values of the first period, and switching off the welding current at the end of the second timed period.

2. A method as defined in claim 1, which includes the step of increasing the amplitude of the welding current progressively for at least a part of the welding cycle.

3. A method as defined in claim 1, which includes the step of increasing the amplitude of the welding current progressively for the remainder of the welding cycle after a predetermined period has elapsed.

4. Apparatus for controlling a resistance welding process comprising:
    a pair of electrodes;
    electric current supply conductors connected to said pair of electrodes to cause a current to flow through workpieces placed between said electrodes;
    sensing means preset in accordance with a predetermined displacement of the electrodes away from one another, such displacement being due to expansion of the workpieces during the welding process;

a time-measuring circuit for measuring the interval required for the sensing means to register the said predetermined displacement during the welding process;

a time-defining circuit the operation of which is initiated by the sensing means registering the said predetermined displacement of the electrodes and which is arranged to switch off the welding current at the end of the time period which it defines; and means interconnecting the time-defining circuit and the time-measuring circuit so that the period defined by the time-defining circuit is governed in accordance with the interval measured by the time-measuring circuit.

5. Apparatus as defined in claim 4, in which said time-measuring circuit and said time-defining circuit include a common electrical capacitance, the time-measuring circuit including a charging circuit for said capacitance and the time-defining circuit including a discharging circuit for said capacitance.